P. J. HAMLER, DEC'D.
J. P. HAMLER, ASSIGNEE.
FERTILIZER DRIER.
APPLICATION FILED FEB. 14, 1921.
Reissued May 23, 1922.
15,362.
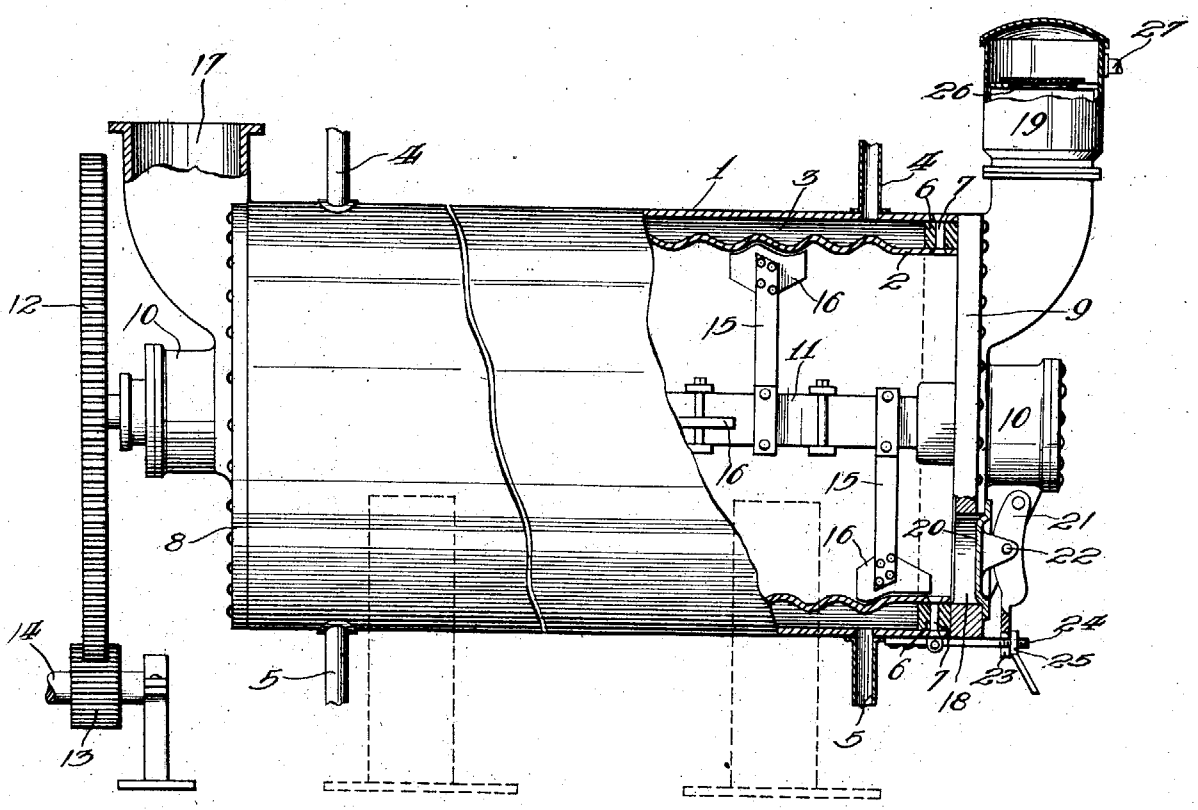
Witness:
Stephen Stebra
Inventor:
Peter J. Hamler,
by Fleming & Fleming Attys.

UNITED STATES PATENT OFFICE.

PETER J. HAMLER, DECEASED, LATE OF CHICAGO, ILLINOIS, BY JEROME P. HAMLER, OF CHICAGO, ILLINOIS, ASSIGNEE.

FERTILIZER DRIER.

15,362. Specification of Reissued Letters Patent. Reissued May 23, 1922.

Original No. 1,321,628, dated November 11, 1919, Serial No. 300,353, filed May 28, 1919. Application for reissue filed February 14, 1921. Serial No. 444,880½.

*To all whom it may concern:*

Be it known that PETER J. HAMLER, deceased, late a citizen of the United States, residing at Chicago, in the county of Cook and State of Illinois, has invented a new and useful Fertilizer Drier, of which the following is a specification.

This invention relates to certain improvements in machines or apparatuses used for drying fertilizer in preparation for its commercial use.

As commonly constructed at the present time, such driers embody an inner and an outer inclosing drum or cylinder of steel, these two drums or cylinders being perfectly plain, spaced apart to form a steam-space, whereby the inner drum is heated, provided with suitable feed and discharge-openings, and an axially positioned agitator-shaft carrying radiating agitator-arms.

While the drier thus described is, to a certain extent, practical for the purpose intended, yet there are many serious objections. Some of such objections are its expensive construction, owing to the fact that it necessarily includes hundreds of stay-bolts and rivets; the necessity of employing comparatively heavy gage metal in order to provide a reasonable foundation for the stay-bolts; the fact that said stay-bolts and rivets become loosened by the contraction and expansion of the metal, thereby causing the drums or cylinders to leak; and, finally, by reason of the heads of the stay-bolts being located at the inner side of the inner drum or cylinder, such form obstructions upon which the material being operated upon finds ready lodgment and furthermore necessitates an undue and an undesirable shortening of the agitator-arms in order that they may escape or clear the heads of the rivets and stay-bolts, thus permitting of this lodgment of material being still further augmented to the extent of forming an insulation around the interior surface of the drum, greatly to the detriment of its heating ability, whereby the efficiency of the apparatus becomes reduced.

The principal objects of this invention are, therefore, to overcome the objections stated, by reducing very materially the cost of manufacture by reason of an entire omission of the now commonly employed hundreds of stay-bolts and rivets; to provide a smooth inner surface for the inner drum or cylinder, thus permitting the agitator-arms to travel close thereto and prevent the accumulation or deposit of material upon said surface, thereby increasing the heating efficiency of the apparatus; to provide an increased heating-surface for the inner cylinder; to provide for the expansion and contraction of the metal; and, finally, by the omission of said stay-bolts and rivets to permit of the use of lighter gage metal in the construction of the cylinders.

And the invention consists in certain features of construction hereinafter referred to and more particularly pointed out in the claims.

Referring to the drawing, in which is illustrated this invention in side elevation and partial section, 1 designates the outer drum or cylinder, within which is inclosed the inner drum or cylinder 2, the latter being of less diameter than the outer drum and combining therewith to form an intermediate annular steam-space 3. Steam under pressure is admitted to the steam-space by means of inlet-pipes 4 located near the opposite ends of the apparatus and leading from any suitable source of steam-supply. At opposite sides the apparatus is provided with exhaust-pipes 5, which may return to the steam-supply or elsewhere.

Spacing-rings 6 may be located at the opposite ends of the apparatus between the two drums or cylinders, rivets 7 being employed to connect the drums or cylinders and the rings.

The outer drum is a plain cylinder, as heretofore, but the inner drum or cylinder is annularly corrugated, preferably as shown, though other forms of corrugations capable of performing the functions and rendering the advantages attained thereby may be substituted. As will be obvious, by thus corrugating the inner drum or cylinder, the same is rendered stronger and better capable of withstanding the steam-pressure; also it provides a much greater heating-surface; provides for expansion and contraction, and, being stronger, may be formed of lighter material and without stay-bolts and rivets, whereby the cost is materially reduced. And, furthermore, the inner surface of the inner cylinder being smooth and unbroken by the presence of rivet-heads, the agitator-arms may be so proportioned that their ends will operate in close proximity to the surface of the inner cylinder, thus preventing accumulations or deposits thereon and its consequent insulation and decreased efficiency.

The ends of the apparatus are closed by heads 8 and 9, bolted to the rings 6, and each head is provided with a central journal-box 10, of some approved design, preferably capable of containing a bath of lubricating-oil.

These journal-boxes support an axially arranged agitator-shaft 11, preferably square in cross-section, and having one of its ends extended beyond one of the journal-boxes and carrying a large gear-wheel 12, meshing with and driven by a smaller gear 13, on a drive-shaft 14, which may receive its power from any suitable source.

Secured to each of the four faces of the agitator-shaft in a successive manner or otherwise, as preferred, by means of ordinary clamps and bolts, in the present instance, are agitator-arms 15, radially disposed from said shaft. Each of said arms has bolted or otherwise affixed to its end a blade 16, the outer edge of which is curved, as shown, to conform to the corrugations of the inner drum or cylinder. By thus shaping the edges of the blades to conform to the inner surface of the drum or cylinder in which they are located, the spaces intervening between the edges of the blades and the wall of the cylinder are negligible, and hence no opportunity is provided for deposits of the material being operated upon to occur. This is a very great improvement over the present construction, wherein the distance between the edges of the blades and surface of the cylinder, as required by the presence of the heads of the rivets, greatly facilitates such deposits, thus materially interfering with the radiation of heat and altogether decreasing the efficiency of the apparatus.

At the front end of the apparatus and leading to the interior of the inner cylinder may be located a feed-hopper 17, while at the opposite end there may be located a discharge-opening 18, the latter being covered by a closure or door 20 pivoted, as at 22, to an intermediate point of the clamping-lever 21 fulcrumed on the head 9. The lower end of this lever may be bifurcated, as at 23, to receive the outer threaded end of a pivoted clamping-bolt 24, upon which is threaded a clamping-nut 25, for the purpose of clamping the lever and door in position to cover said discharge-opening.

There may also be employed at the rear end of the apparatus a superimposed chamber 19 communicating with the interior of the inner drum or cylinder, locating in such chamber a foraminous diaphragm 26, and connecting the upper portion of such chamber thus divided to any ordinary exhaust-fan or blower (not shown) by a pipe 27.

In operation, the fertilizer, in a plastic state, by reason of the moisture contained therein, is introduced through the hopper 17 into the heated inner cylinder or drum 2, the mass being constantly and slowly agitated and subjected to the high temperature for several hours, by which time it will have become dehydrated and may be removed through the discharge opening in a manner obvious.

By providing an inner cylinder constructed of metal of the requisite gage, and by providing closely spaced corrugations, sufficient strength and rigidity can be afforded to avoid the necessity for the use of any stay-bolts, so that the inner and outer shells are secured together only at the ends of the cylinder, and at the same time the structure will be sufficiently resistant to withstand distortional strains due to steam pressure between the shells, as well as strains incident to the mechanical vibration to which the drier will be subjected when in use. Such vibration, when applied to a drier employing stay-bolts, has a tendency to loosen or wear down the bolt-heads or the metal contiguous thereto, so that leakage frequently results, and a general deterioration of the structure quickly ensues. It is also difficult, in applying and tightening said stay-bolts, to maintain perfect uniformity in the curvature of the structure, and any distortion from a condition of perfect circularity in cross section will be reflected by an irregular action of the agitator blades, which will tend to approach toward and recede from the surface of the drum during a cycle of revolution rather than to maintain a uniform proximity, which is essential to best results in operation. The presence of a multiplicity of stay-bolts also serves to afford additional metallic conductors for the dissemination of heat with a resulting loss of efficiency of the apparatus.

Although the specification and drawings define a specific manner in which the inner and outer shells are secured together without the employment of stay-bolts, it is obvious that means of attachment other than those particularly specified might be used to obtain a similar result, without departing from the spirit of the invention.

As will be readily appreciated, the principal wear upon the inner cylinder is at the lower side, so that this side is the first to become impaired by reason thereof, and it has been customary in the use of the conventional form of these apparatuses, when thus impaired, to reverse them, so that what was the lower side then becomes the upper side. In this manner the life of the apparatus was increased. By this invention, one is enabled, practically, to still further and to about double the extent of the life of the apparatus by turning the same only one fourth of a revolution, this by reason of the fact that so much of the bottom surface of the inner cylinder does not become impaired as heretofore because of the fact that it is kept clear of deposits of matter to a far greater extent, as heretofore explained, and for the further reason that there is an utter absence of rivets that become loosened and their efficiency impaired by reason of such excess deposits of material.

The following is claimed:

1. In an apparatus of the class described, the combination with an outer cylinder, an inner inclosed annularly corrugated cylinder, and an intermediate spacing-ring at each end of said cylinder, of opposite heads bolted to the outer faces of the rings and provided with bearings, an agitator-shaft mounted for rotation in the bearings, agitator-arms radiating from the shaft, and blades carried by said arms and having their outer edges curved to conform to the corrugations of the inner cylinder and positioned in close proximity therewith.

2. In a machine of the class described, the combination with inner and outer spaced apart cylinders, heads for the cylinders, one of which heads is provided with an opening in its upper side, of a chamber located at one end of the machine, a pipe connecting the lower end of the same with the opening in the head, a foraminous diaphragm subdividing the chamber and an exhaust pipe leading from the chamber above the diaphragm.

3. In an apparatus of the class described, the combination of an outer cylinder, an inner inclosed annularly corrugated cylinder of adequate strength and rigidity to withstand distortional strains without intermediate reinforcement, and connecting means at the ends of the cylinders for securing and maintaining said cylinders in spaced relation to one another, the inner cylinder being imperforate throughout its length intermediate the end connecting means, and opposite heads secured to the structure and provided with centrally disposed bearings, an agitator shaft mounted for rotation in the bearings, agitator arms radiating from the shaft, and blades carried by said arms and having their outer edges configured to closely conform to the corrugations of the inner cylinder and positioned in close proximity therewith, substantially as described.

4. In an apparatus of the class described, the combination of an outer cylinder, an inner inclosed annularly corrugated cylinder of adequate strength and rigidity to withstand distortional strains without intermediate reinforcement, connecting means at the ends of the cylinders for securing and maintaining said cylinders in spaced relation to one another, the inner cylinder being imperforate throughout its length intermediate the end connecting means and agitating means within the inner cylinder, provided with blades having their outer edges configured to closely conform to the corrugations of the inner cylinder and positioned in close proximity thereto, substantially as described.

5. In an apparatus of the class described, the combination of an outer cylinder, an inner inclosed annularly corrugated cylinder of adequate strength and rigidity to withstand distortional strains without intermediate reinforcement, connecting means at the ends of the cylinders for securing and maintaining said cylinders in spaced relation to one another, the inner cylinder being imperforate throughout its length intermediate the end connecting means and rotatable agitating means within the cylinder, said agitating means being extended to points closely contiguous to the surface of the inner cylinder, and having an end contour conformable to the corrugations of the inner cylinder, substantially as described.

6. In an apparatus of the class described, the combination of an outer cylinder, an inner inclosed annularly corrugated cylinder of adequate strength and rigidity to withstand distortional strains without intermediate reinforcement, connecting means at the ends of the cylinders for securing and maintaining said cylinders in spaced relation to one another, and agitating means within the cylinder, said agitating means being extended to points closely contiguous to the surface of the inner cylinder, and having an end contour conformable to the corrugations of the inner cylinder, and means for securing relative rotation between the cylinders and agitating means, substantially as described.

JEROME P. HAMLER,
*Assignee.*